(12) United States Patent
Kabasawa et al.

(10) Patent No.: US 6,392,847 B1
(45) Date of Patent: May 21, 2002

(54) DISK APPARATUS WITH SPECIAL COILS FOR VOICE COIL MOTOR

(75) Inventors: Hidetoshi Kabasawa, Saitama-Ken; Nobuyuki Oida, Tokorozawa, both of (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/265,450

(22) Filed: Mar. 10, 1999

(30) Foreign Application Priority Data

Mar. 12, 1998 (JP) ............................................. 10-61613

(51) Int. Cl.[7] ............................................. G11B 21/02
(52) U.S. Cl. ..................................................... 360/266.9
(58) Field of Search ................................ 360/266.9, 75, 360/250, 255.1, 255.4, 264.7, 266.2, 266.4, 266.5, 266.6, 266.7, 266.8; 369/249, 215, 219, 244

(56) References Cited

U.S. PATENT DOCUMENTS

| | | | | |
|---|---|---|---|---|
| 3,643,242 A | * | 2/1972 | Bryer ........................... 340/174 |
| 4,573,094 A | * | 2/1986 | Gibeau et al. ............... 360/106 |
| 4,646,182 A | * | 2/1987 | Sakurai ........................ 360/104 |
| 4,743,987 A | * | 5/1988 | Farmer et al. ............... 360/106 |
| 5,130,873 A | * | 7/1992 | Yumura et al. .............. 360/106 |
| 5,138,605 A | * | 8/1992 | Shtipelman et al. ........ 369/215 |
| 5,257,255 A | * | 10/1993 | Morimoto et al. ............ 369/53 |
| 5,416,658 A | * | 5/1995 | Sega et al. ................... 360/106 |
| 5,504,636 A | * | 4/1996 | Yuki et al. ................ 360/97.01 |
| 5,850,322 A | * | 12/1998 | Shimazu et al. ............ 360/106 |

FOREIGN PATENT DOCUMENTS

| | | | |
|---|---|---|---|
| JP | 1-61877 | * | 4/1989 |
| JP | 1-61877 A | * | 4/1989 |
| JP | 4-26352 | | 1/1992 |
| JP | 2556620 | | 8/1997 |

* cited by examiner

*Primary Examiner*—William Klimowicz
*Assistant Examiner*—Chen Tianjie
(74) *Attorney, Agent, or Firm*—Anderson Kill & Olick; Eugene Lieberstein; Michael N. Meller

(57) ABSTRACT

A disk apparatus has a head carriage and a head carriage drive mechanism. The head carriage drive mechanism has voice coil motors located on each side of the head carriage. The voice coil motors each have a drive coil, the two drive coils having different numbers of turns and being connected in parallel to a power source. The two voice coil motors generate identical propulsive forces despite having a different number of turns in the respective drive coils, making it possible to move the head carriage with precision. A head carriage position detecting mechanism is included in a space formed beneath the drive coil having the smaller number of turns, for added precision in positioning the head carriage.

3 Claims, 8 Drawing Sheets

$X_1 \longleftrightarrow X_2$ $N_2 > N_1$

DISK APPARATUS WITH SPECIAL COILS FOR VOICE COIL MOTOR

BACKGROUND OF THE INVENTION

1. Field of the Invention

The present invention relates generally to a disk apparatus, and more particularly to a floppy disk apparatus for writing data to and reading data from a rotating floppy disk by movement of a head carriage.

2. Description of the Related Art

Conventionally, floppy disk apparatuses are widely used in personal computers as external memory devices. In recent years, in an effort to cope with the coming video age, floppy disk apparatuses have to be developed that greatly expand memory capacity from the current 1.44 MB to 200 MB or more. In order to expand memory capacity to such a large extent, it is necessary to increase the current 300 rpm rotation speed of the floppy disk by 10 times or more and at the same time increase the current track density of 135 tracks per inch (hereinafter tpi) by 10 times or more, to 2,000 to 3,000 tpi. In order to reliably write and read data under these high-speed, high-density conditions, a high degree of precision is required of the drive of the head carriage of the floppy disk apparatus so as to position the magnetic heads of the head carriage with a high degree of precision. Additionally, the floppy disk apparatus must be slim because it is included within the personal computer apparatus.

FIG. 8(A) and FIG. 8(B) show a head carriage drive mechanism 10 for a conventional high-density floppy disk device. The head carriage drive mechanism 10 has a head carriage 11. The head carriage 11 has a head 12 and is moved and positioned longitudinally in the Y1-Y2 direction along a radius of a rotating floppy disk 17 by a first voice coil motor 13 and a second voice coil motor 14 (hereinafter referred to collectively as first and second voice coil motors 13, 14) provided on either side of the head carriage 11 while being supported by guide rods 15 and 16. The first voice coil motor 13 comprises a magnetic circuit structure 23 including a permanent magnet 20 and yokes 21 and 22, and a drive coil 24 fitted to yoke 22 and fixedly mounted on the head carriage 11. The second voice coil motor 14 comprises a magnetic circuit structure 33 including a permanent magnet 30 and yokes 31 and 32, and a drive coil 34 fitted to yoke 32 and fixedly mounted on the head carriage 11.

As shown in FIG. 8(C), the drive coil 24 and drive coil 34 are connected in series to a power source 40. The first and second voice coil motors 13, 14 generate identical propulsive forces and the head carriage 11 is moved in the Y1-Y2 direction with precision.

When the first and second voice coil motors 13, 14 generate identical propulsive forces and the drive coil 24 and drive coil 34 are connected in series to the power source 40, a number of turns in drive coil 24 and a number of turns in drive coil 34 are identical. As a result, it is difficult to create a space for including a head carriage position detecting mechanism that uses an encoder scale.

Moreover, it is difficult to independently set the propulsive forces of the first and second voice coil motors 13, 14 because drive coil 24 and drive coil 34 are connected in series to the power source 40, thus limiting the freedom with which the head carriage drive mechanism can be designed.

SUMMARY OF THE INVENTION

Accordingly, it is an object of the present invention to provide a disk apparatus in which the problems described above are eliminated.

The above-described object of the present invention is achieved by a disk apparatus comprising:

a frame;

disk rotating means for supportably rotating a floppy disk;

a head for writing data to and reading data from a disk being rotated by said disk rotating means;

a head carriage for holding said head, said head carriage being movable in a direction of a radius of a disk supported by said disk rotating means; and a first voice coil motor and a second voice coil motor for moving said head carriage provided on both sides of said head carriage, said first voice coil motor and second voice coil motor each respectively comprising:

a magnetic circuit structure mounted on said frame; and drive coils mounted on said head carriage, wherein said first voice coil motor and second voice coil motor are connected in parallel to an electric power source.

According to the above-described disk apparatus, it is possible to make the first voice coil motor and the second voice coil motor each generate an identical propulsive force even when the drive coil of the first voice coil motor and the drive coil of the second voice coil motor each have a different number of turns. Additionally, by connecting in series a resistor to one of either the first drive coil or the second drive coil it is also possible to make the first voice coil motor and the second voice coil motor each generate a slightly different propulsive force even when the drive coil of the first voice coil motor and the drive coil of the second voice coil motor have an identical number of turns.

As a result, it is possible to create a space for accommodating a head carriage position detecting mechanism that uses an encoder scale, thus expanding the freedom with which the head carriage drive mechanism can be designed.

Other objects, features and advantages of the present invention will become more apparent from the following detailed description when read in conjunction with the accompanying drawings.

DESCRIPTION OF THE PREFERRED EMBODIMENTS

A detailed description will now be given of an embodiment of a disk apparatus according to the present invention, with reference to FIG. 1 and FIGS. 2(A), 2(B) and 2(C).

Figure 1:
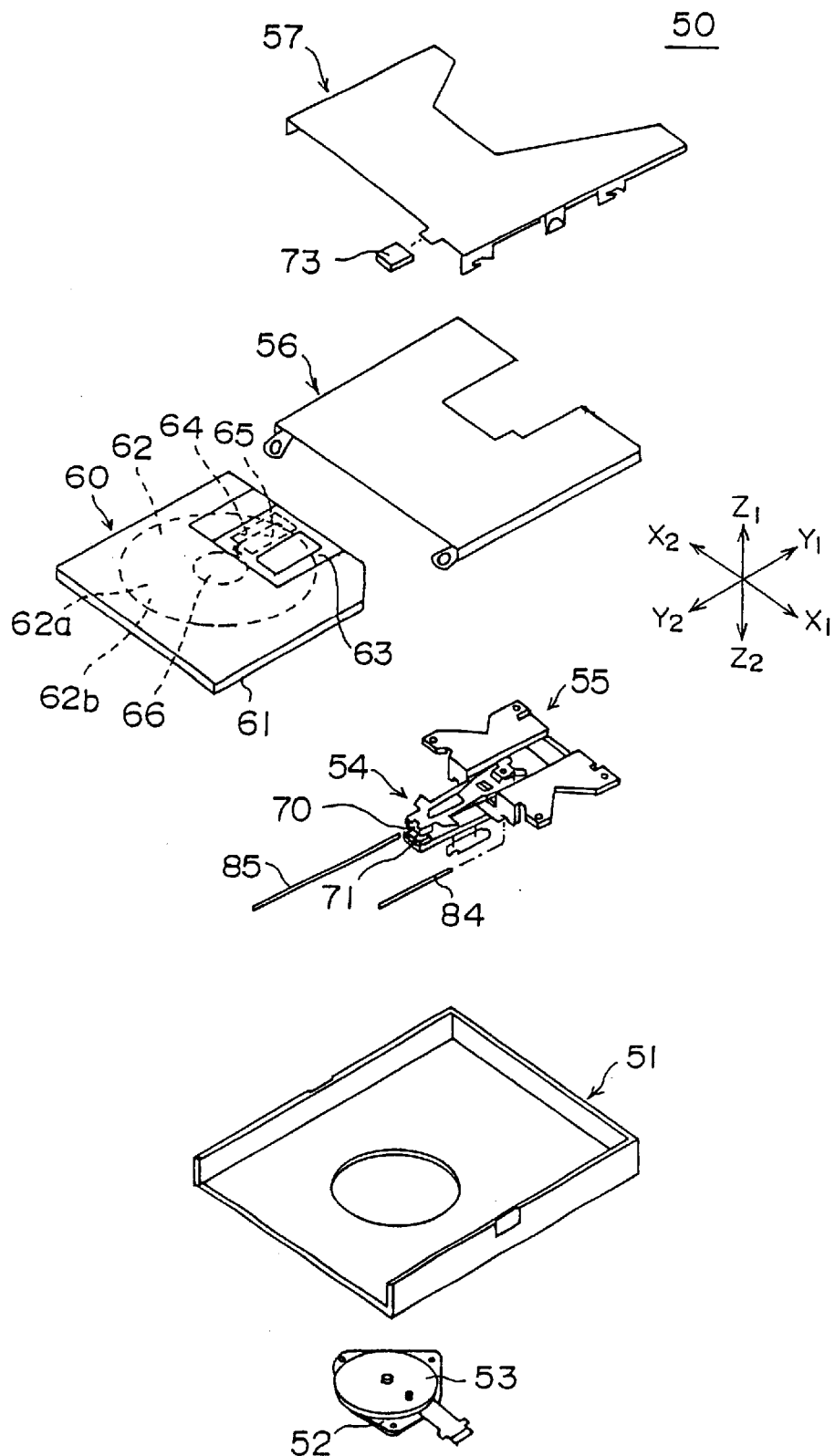
FIG. 1 is an exploded view of a first embodiment of a disk apparatus according to the present invention.
Figure 2A:
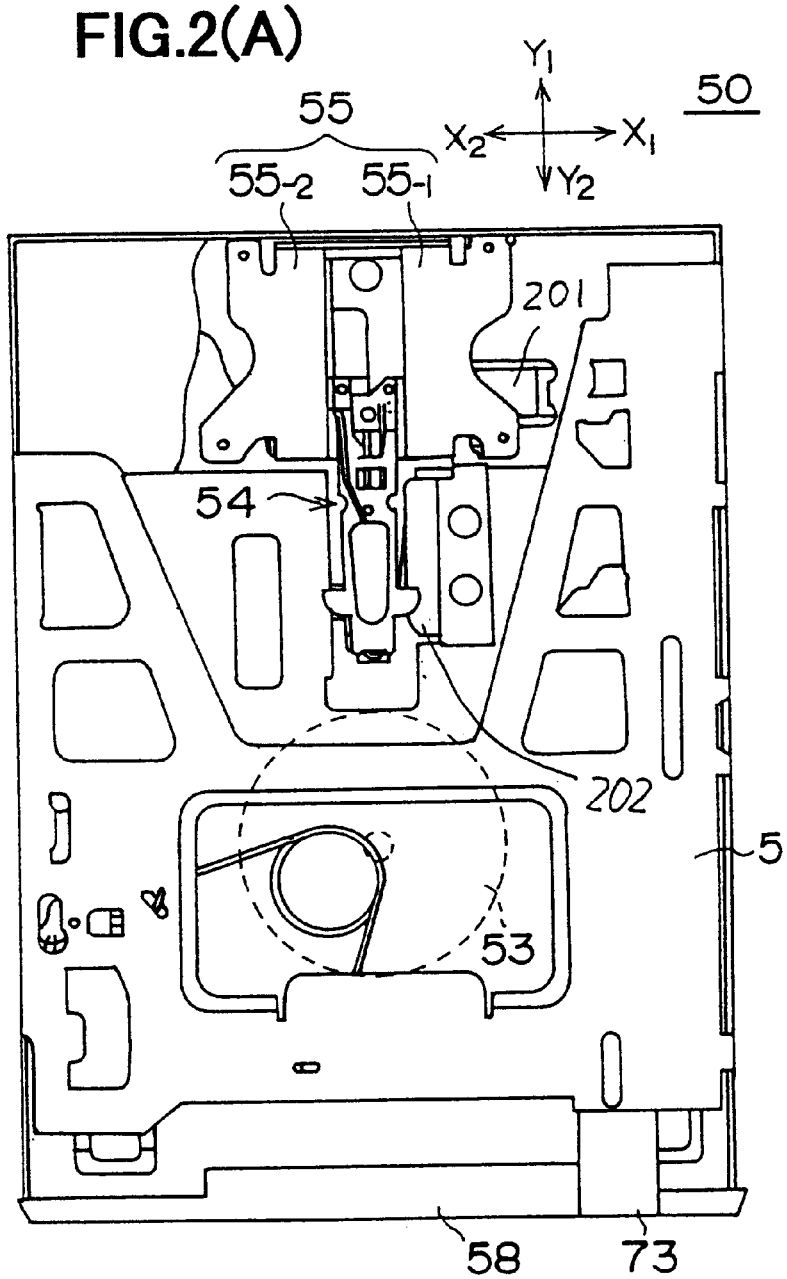
FIGS. 2(A), 2(B) and 2(C) are diagrams showing top, front and side views, respectively, of a first embodiment of a disk apparatus according to the present invention.
Figure 2C:
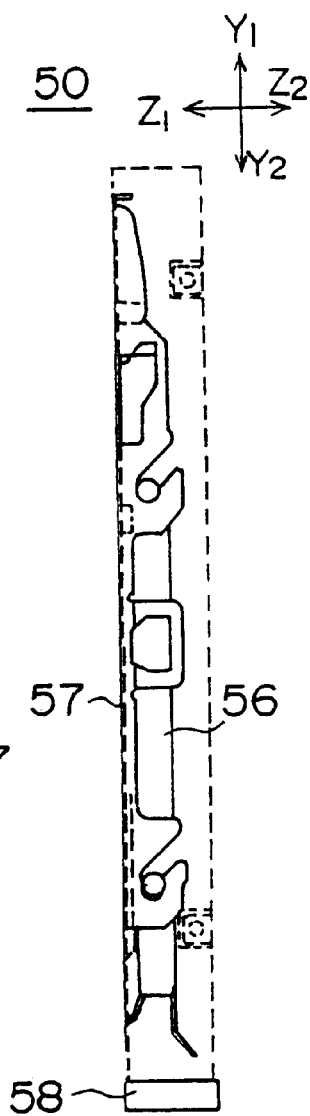
Figure 2B:
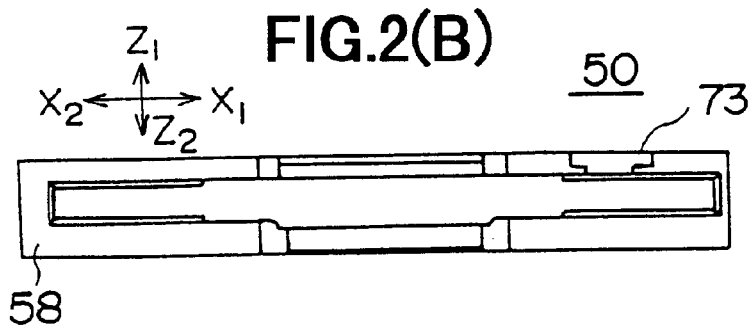

FIG. 1 is an exploded view of an embodiment of a disk apparatus according to the present invention. FIGS. 2(A), 2(B) and 2(C) are diagrams showing top, front and side views, respectively, of an embodiment of a disk apparatus according to the present invention. In the diagrams, X1-X2 represents the horizontal dimension, Z1-Z2 represents the vertical dimension and Y1-Y2 represents the longitudinal front and rear depth dimension.

The floppy disk apparatus 50 is a high-density apparatus, and has a frame 51, a turntable motor 52, a turntable 53, a head carriage 54, a voice coil motor 55, a holder 56, a slider 57 that also functions as a cover, and a front bezel 58.

A disk cartridge 60 is used with the floppy disk apparatus 50. A cartridge body 61 of the disk cartridge 60 contains internally a floppy disk 62 having a diameter of 3.5 inches. Further, a shutter 63 is provided on an edge of the cartridge body 61. The shutter 63 covers an upper opening 64 and a lower opening 65 in an upper and lower surface of the cartridge body 61, respectively. A hub 66 of the floppy disk 62 is exposed at the lower surface of the cartridge body 61.

When inserted from the front bezel 58 toward the rear, that is, in the Y1 direction, the disk cartridge 60 fits inside the holder 56, the shutter 62 slides horizontally in the X2 direction and the openings 64 and 65 are opened. An upper magnetic head 70 opposes the upper opening 64 and a lower magnetic head 71 opposes the lower opening 65. When a lock is released the slider 57 slides toward the front, that is, in the Y2 direction, lowering the holder 56 together with the disk cartridge 60 in the Z2 direction. The disk cartridge 60 is thus loaded into the floppy disk apparatus 50, the hub 66 of the floppy disk 62 is set upon the turntable 53 and the lower opening 65 is placed over the lower magnetic head 71 so as to bring the lower magnetic head 71 into contact with a lower surface 62b of the floppy disk 62. The floppy disk 62 is then rotated by the turntable motor 52 at a speed of approximately 3,600 rpm. Thereafter a head load mechanism (not shown) is activated by a solenoid 201 (see FIG. 2(A)) being excited to lower a lift arm 202. The upper magnetic head 70, which is supported by the lift arm, then descends into the upper opening 64 to contact an upper surface 62a of the floppy disk 62.

The head carriage 54 is moved longitudinally in the Y1-Y2 direction by the voice coil motor 55 and data is written to or read from the surface of the floppy disk, which has been formed into tracks of 2,000–3,000 tpi, by the upper magnetic head 70 and lower magnetic head 71. At this point, the upper magnetic head 70 and lower magnetic head 71 float slightly off the surface of the floppy disk due to the speed with which the floppy disk rotates.

By pressing the eject button 73 the disk cartridge 60 is ejected by moving first upward in the Z1 direction and then forward in the Y2 direction.

A detailed description will now be given of the head carriage 54 and the voice coil motor 55, by reference to FIG. 3 through FIG. 7.

As shown in FIG. 3 through FIG. 7, the head carriage 54 comprises a carriage body 80, an upper head arm 81, a lower magnetic head 71 provided on an upper front edge of the carriage body 80 and an upper magnetic head 70 provided on a lower front edge of the upper head arm 81. Hollow drive coils 82-1 and 82-2 are fixedly mounted on an X1 and an X2 side of the carriage body 80. As is explained below, the head carriage 54 is supported by parallel guide rods 84 and 85 affixed to the frame 51 so as to be movable longitudinally in the Y1-Y2 direction.

Figure 3:
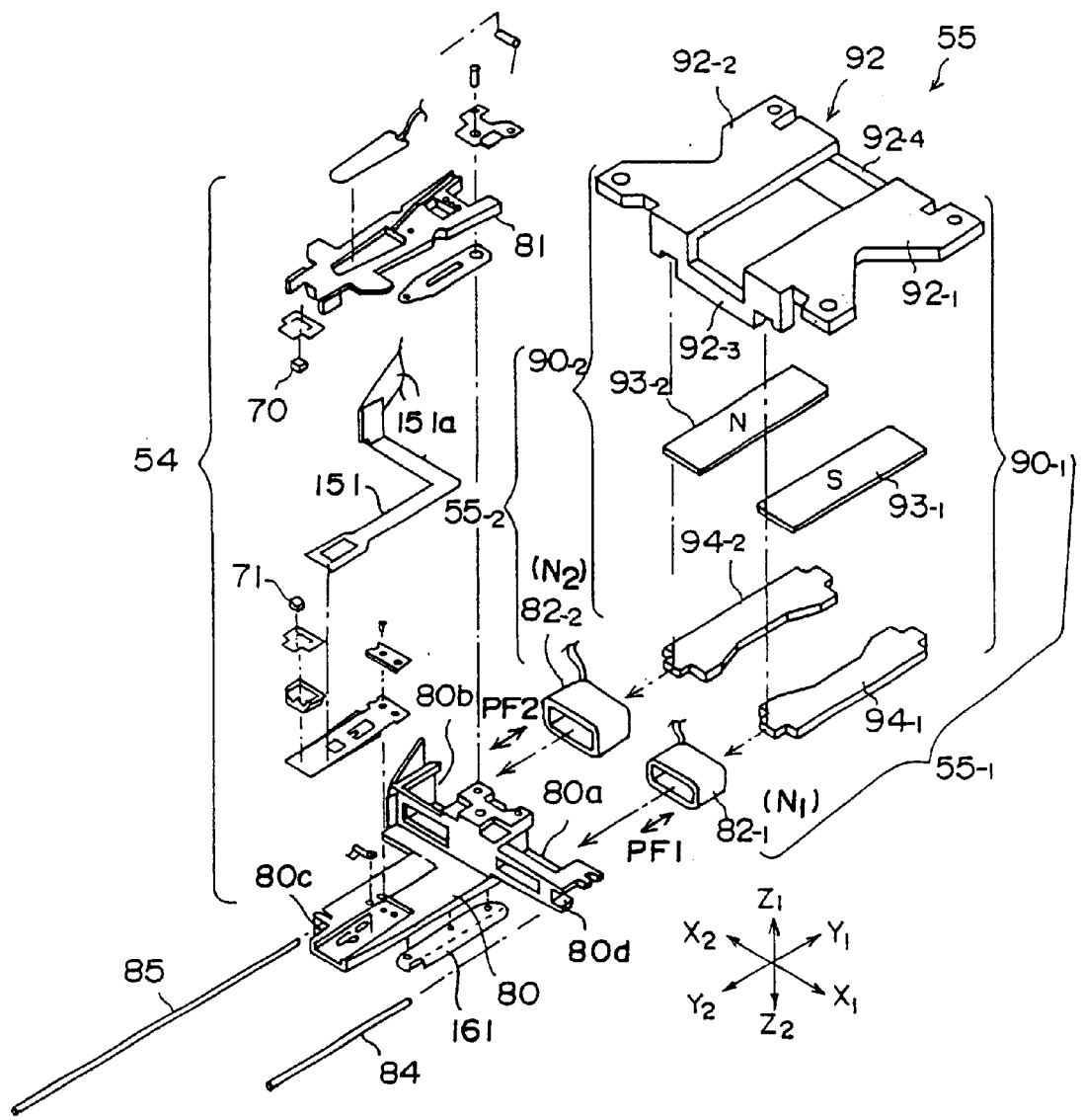
FIG. 3 is an exploded view of a head carriage and a voice coil motor of a first embodiment of the disk apparatus according to the present invention.

The drive coils 82-1 and 82-2 are fitted into concave portions 80a and 80b provided on the carriage body 80 and fixedly positioned thereat. As shown in FIG. 3, guide rod 85 is engaged with a bearing portion 80c of the carriage body 80. Guide rod 84 fits into a U-shaped holding portion 80d of the carriage body 80.

Figure 4:
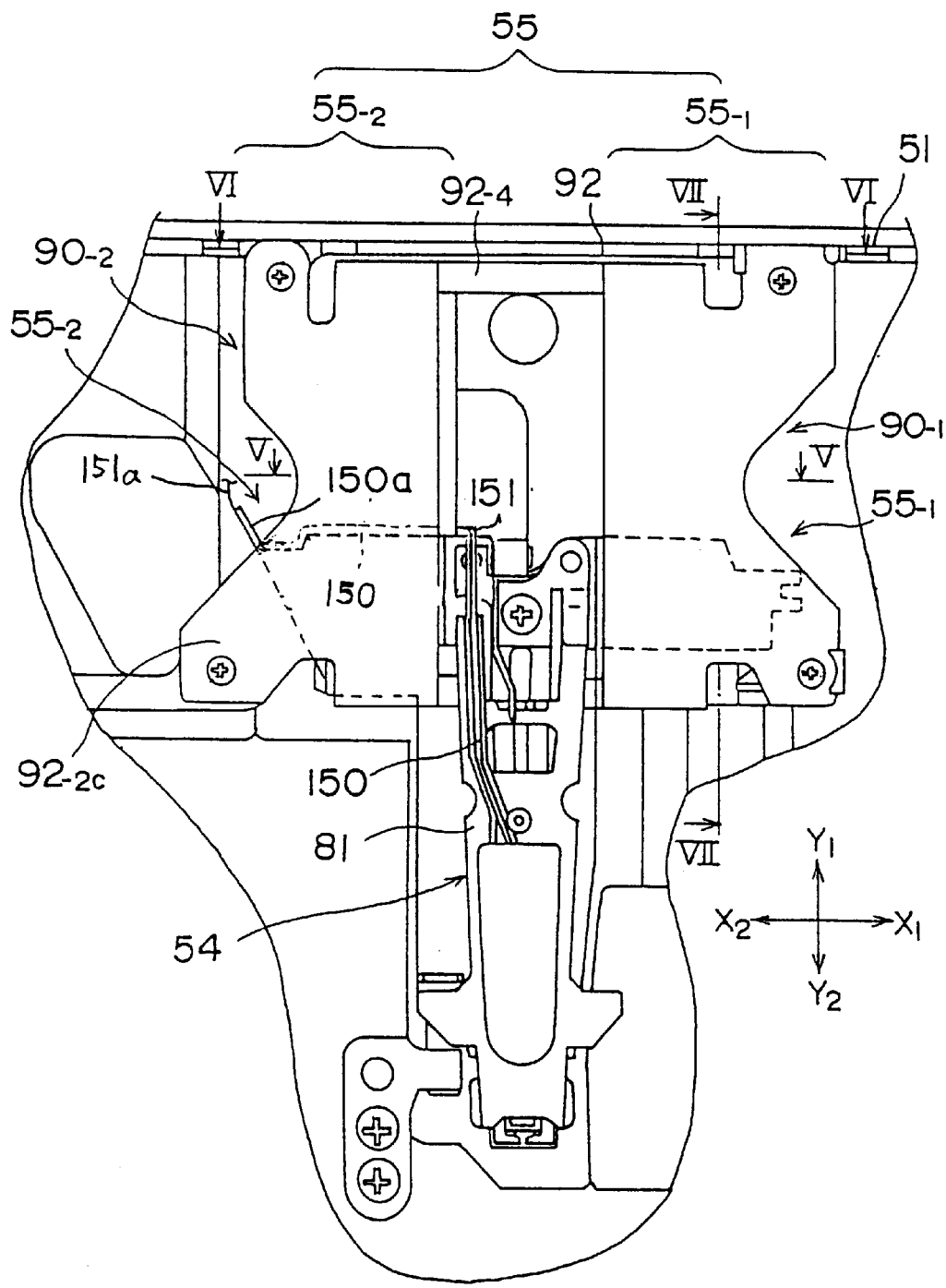
FIG. 4 is a top surface view of a head carriage and a voice coil motor of a first embodiment of the disk apparatus according to the present invention.

As shown in FIG. 3 and FIG. 4, a strip of flexible cable 151 is connected to the lower magnetic head 71. This strip of flexible cable 151 extends laterally away from the carriage body 80 in the horizontal X2 direction and has an extended portion 151a having a length adequate to not restrict the movement of the head carriage 11.

As shown in FIG. 3 and FIG. 4, the signal lead wire 150 attached to the upper magnetic head 70 is fixedly mounted on the upper head arm 81, lead along the upper head arm 81 rearward in the Y1 direction, further lead along the rear Y1 edge of the head carriage 54 laterally in the horizontal X2 direction and soldered to the extended flexible cable 151a at position 150.

The voice coil motor 55 comprises voice coil motor 55-1 and voice coil motor 55-2 positioned parallel with respect to each other on the X1 and X2 sides, respectively, of a path along which the head carriage 54 moves. Voice coil motor 55-1 on the X1 side comprises X1-side magnetic circuit structure 90-1 and X1-side drive coil 82-1. Voice coil motor 55-2 on the X2 side comprises X2-side magnetic circuit structure 90-2 and X2-side drive coil 82-2. The X1-side magnetic circuit structure 90-1 and X-2 side magnetic circuit structure 90-2 are substantially symmetrical to each other with respect to a center line 91 of the path along which the head carriage 54 moves. A magnetic circuit structure assembly 100 comprises the X1-side magnetic circuit structure 90-1 and X-2 side magnetic circuit structure 90-2.

Figure 6:
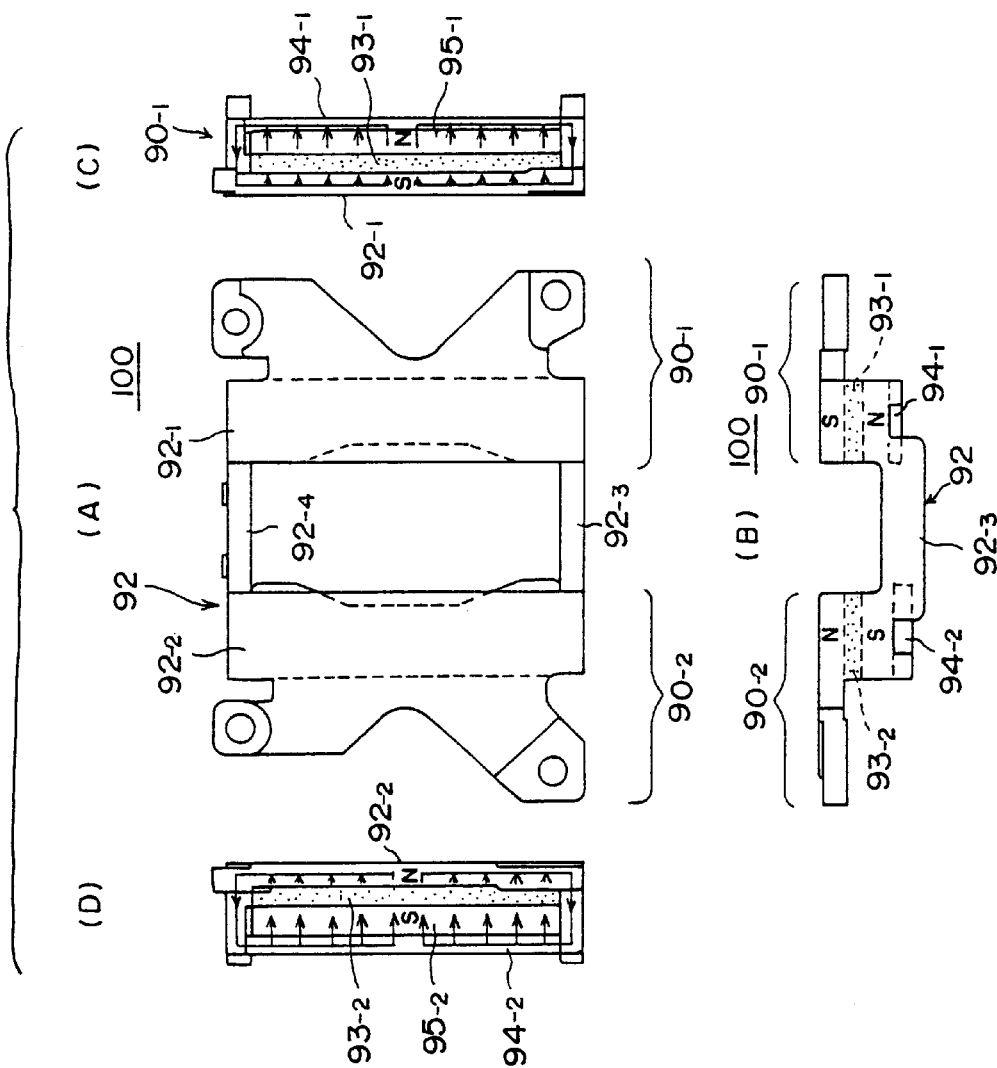
FIG. 6 is a diagram showing a magnetic circuit structure.

As shown in FIG. 6, the magnetic circuit structure assembly 100 has a base comprising a yoke member 92 for mounting a permanent magnet. This yoke member 92 in turn comprises an X1-side yoke portion 92-1 for mounting a permanent magnet and an X2-side yoke portion 92-2 for mounting a permanent magnet, as well as a rear Y2-edge frame portion 92-3 and a front Y1-edge frame portion 92-4 that connect the X1-side yoke portion 92-1 and the X2-side yoke portion 92-2 in such a way as to form a substantially square shape when viewed from above.

The X1-side magnetic circuit structure 90-1 comprises the X1-side yoke portion 92-1 for mounting a permanent magnet, a permanent magnet 93-1 fixedly mounted on a lower surface of the X1-side yoke portion 92-1, an X1-side drive coil yoke 94-1 and a magnetic gap 95-1. The permanent magnet 93-1 is essentially a long, narrow strip, an upper surface of which is the S-pole and a lower surface of which is the N-pole. The drive coil yoke 94-1 axially passes through the drive coil 82-1 and ends of the drive coil yoke 94-1 are affixed to the Y2-edge frame portion 92-3 and Y1-edge frame portion 92-4, respectively. The magnetic gap 95-1 is formed between the permanent magnet 93-1 and the X1-side drive coil yoke 94-1. The drive coil 82-1 surrounds and is radially spaced from the drive coil yoke 93-1.

The X2-side magnetic circuit structure 90-2 comprises the X2-side yoke portion 92-2 for mounting a permanent magnet, a permanent magnet 93-2 fixedly mounted on a lower surface of the X1-side yoke portion 92-2, an X2-side drive coil yoke 94-2 and a magnetic gap 95-2. The permanent magnet 93-2 is essentially a long, narrow strip, an upper surface of which is the N-pole and a lower surface of which is the S-pole. It will be observed that this pole configuration of permanent magnet 93-2 is the opposite of the pole configuration of permanent magnet 93-1. The drive coil yoke 94-2 axially passes through the drive coil 82-2 and ends of the drive coil yoke 94-2 are affixed to the Y2-edge frame portion 92-3 and Y1-edge frame portion 92-4, respectively. The magnetic gap 95-2 is formed between the permanent magnet 93-2 and the X2-side drive coil yoke 94-2. The drive coil 82-2 surrounds and is radially spaced from the drive coil yoke 93-2.

Figure 5A:
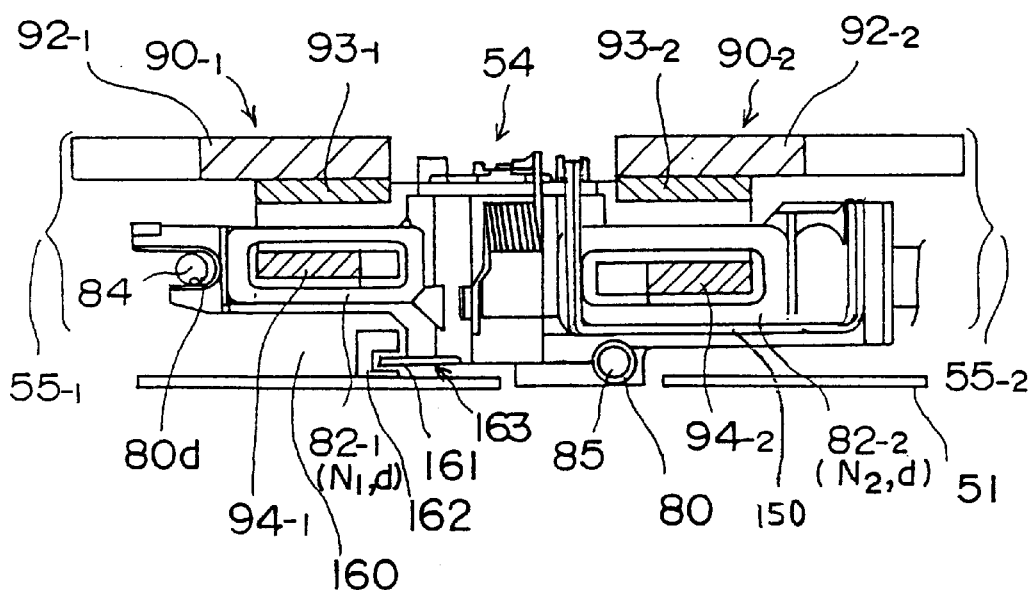
FIGS. 5(A), 5(B) are a cross-sectional view along the line V—V in FIG. 4 and a systems diagram, respectively.
Figure 5B:
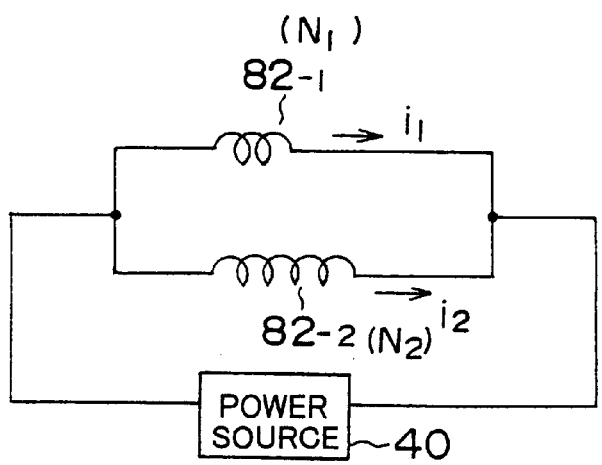

As shown in FIG. 5(B), drive coil 82-1 and drive coil 82-2 are connected in parallel to a power source 40. The drive coil 82-1 of the X1-side voice coil motor 55-1 has electrical wire having a diameter of 0.12 mm, a number of turns N1 of said electrical wire being approximately 201. The drive coil 82-2 of the X2-side voice coil motor 55-2 has electrical wire having a diameter of 0.12 mm, a number of turns N2 of said electrical wire being 403. Thus, the ratio of the number of turns N1 to the number of turns N2 is 1:2 and the resistance of the drive coil 82-1 is therefore less than the resistance of the drive coil 82-2.

When a drive current is sent to the drive coils 82-1 and 82-2 by a control circuit, the ratio of a drive current i1 sent to the drive coil 82-1 to a drive current i2 sent to the drive coil 82-2 is 2:1 because the drive coils 82-1 and 82-1 are connected in parallel.

Accordingly, the X1-side voice coil motor 55-1 and the X2-side voice coil motor 55-2 each generate approximately equal propulsive forces and the head carriage 54 is moved with precision. As a result of this more precise positioning of the head carriage 54, data can be accurately and reliably written to and read from even high-density disks having a track density in the range of 2,000 to 3,000 tpi.

It should be noted that the drive coil 82-1 having the lesser number of turns is smaller in size than the drive coil 82-2 having the greater number of turns. As a result, as shown in FIG. 5(A) a space 160 is formed between the drive coil 82-1 and the frame 51. By using this space 160 to mount an encoder scale 161 on the carriage body 80 and a photocoupler 162 on the frame 51, a head carriage position detecting mechanism 163 can be provided for detecting a position of the head carriage. By providing a head carriage position detecting mechanism 163 in this space 160 formed between the drive coil 82-1 and the frame 51 the floppy disk apparatus 50 can be made slim.

As can be readily appreciated, the ratio of the number of turns N1 to the number of turns N2 is not limited to 1:2 but can be in any ratio. Nevertheless the X1-side voice coil motor 55-1 and the X2-side voice coil motor 55-2 will generate identical propulsive forces, respectively.

A detailed description will now be given of a second embodiment of a disk apparatus according to the present invention, with reference to FIG. 7.

Figure 7:
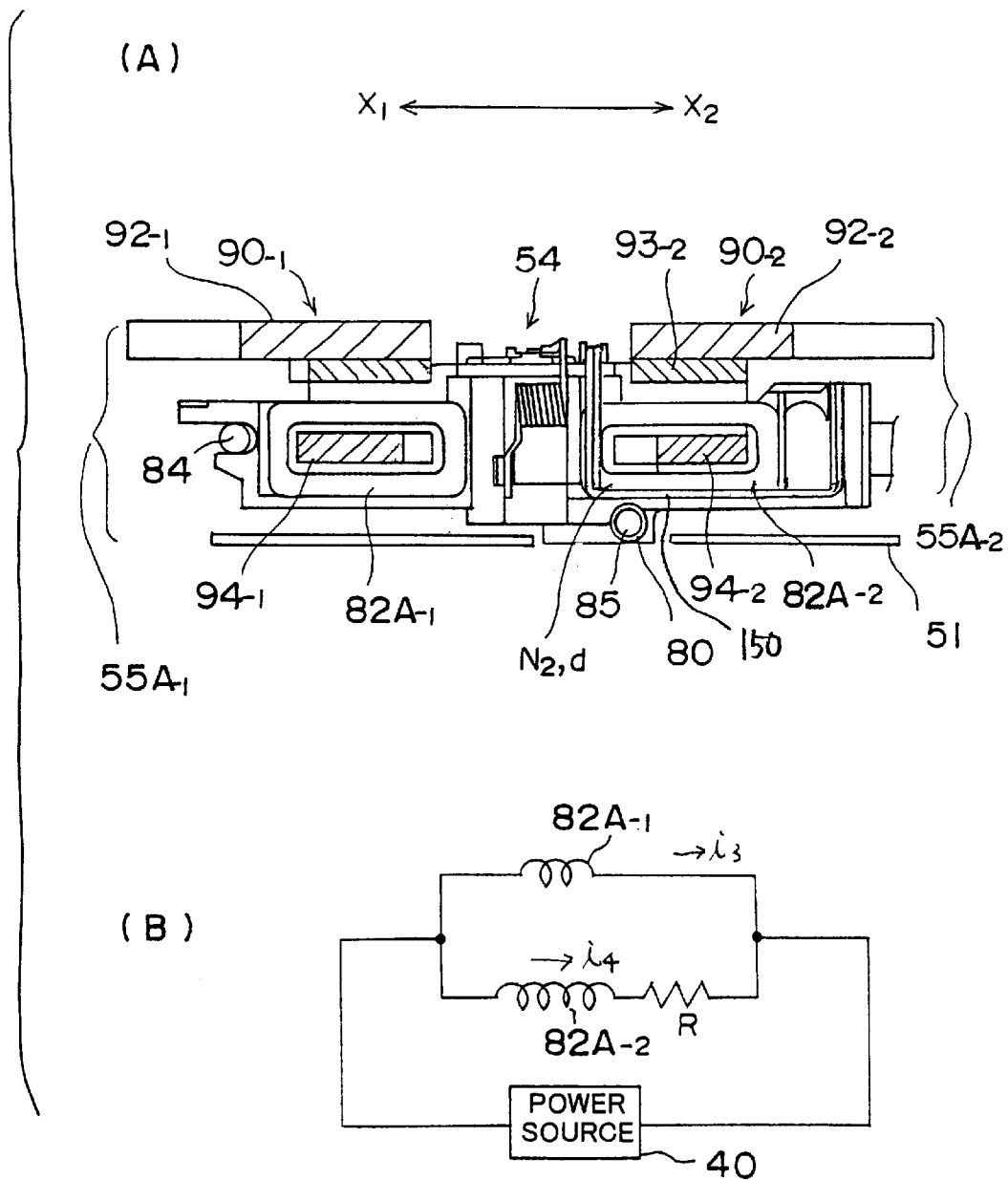
FIG. 7 is a diagram showing a head carriage and voice coil motor portions of a second embodiment of the disk apparatus according to the present invention.
Figure 8A:
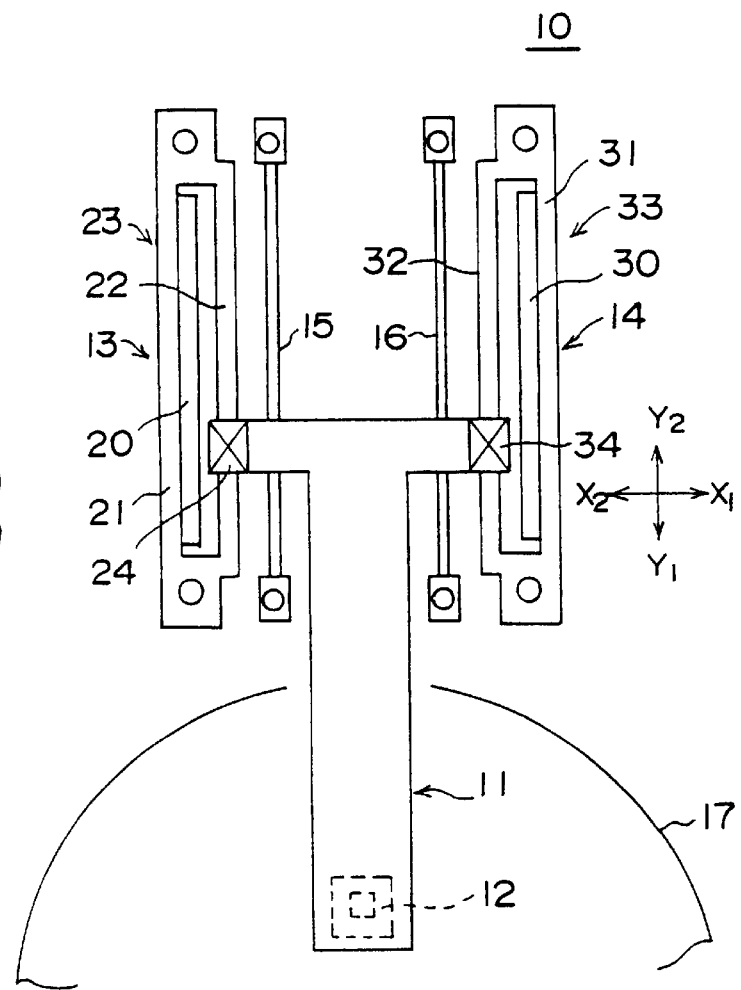
FIGS. 8(A), 8(B) and 8(C) are diagrams showing a conventional floppy disk device head carriage drive mechanism.
Figure 8B:
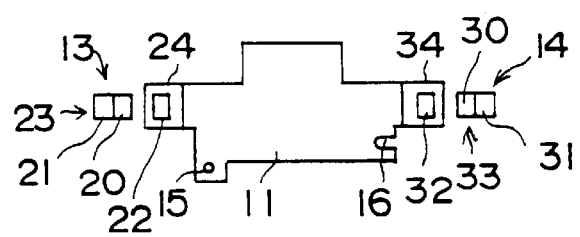
Figure 8C:
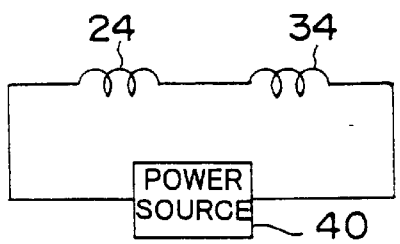

FIG. 7, like FIG. 5(A) above, is a diagram showing a head carriage 54 and a voice coil motor 55A. The voice coil motor 55A is essentially identical to the voice coil motor 55 described above. Voice coil motor 55A comprises voice coil motor 55A-1 and voice coil motor 55A-2 positioned parallel with respect to each other on the X1 and X2 sides, respectively, of the path along which the head carriage 54 moves. Except for the drive coils 82A-1 and 82A-2, voice coil motors 55A-1 and 55A-2 are identical to voice coil motors 55-1 and 55-2 described above.

Drive coils 82A-1 and 82A-2 have electrical wires of an identical diameter and an identical number of turns. As shown in FIG. 7, drive coils 82A-1 and 82A-2 are connected in parallel. A resistor R is connected in series with drive coil 82A-2 on the drive coil 82A-2 side. The presence of this resistor R causes a current i3 flowing to drive coil 82A-1 to be greater than a current i4 flowing to drive coil 82A-2, and as a result the propulsive force generated by the X1-side voice coil motor 55A-1 is slightly larger than the propulsive force generated by the X2-side voice coil motor 55A-2.

The configuration described above, when used where the X1-side load is slightly greater than the X2-side load when moving the head carriage 54, makes it possible to move the head carriage 54 with precision.

As can be readily appreciated from the above description, the present embodiment makes it possible to freely design voice coil motors to suit the loads arising on the X1 side and X2 side of the head carriage 54 when the head carriage 54 is moved.

The above description is provided to enable any person skilled in the art to make and use the invention and sets forth the best mode contemplated by the inventors of carrying out their invention. In addition, the present invention is not limited to the specifically disclosed embodiments and variations, and modifications may be made without departing from the scope of the present invention.

The present application is based on Japanese priority application No.10-61613 filed on Mar. 12, 1998, the entire contents of which are hereby incorporated by reference.

What is claimed is:

1. A disk apparatus comprising:

a frame;

a disk rotating means for supportably rotating a disk;

a head for writing data to and reading data from the rotating disk;

a head carriage for radially moving said head relative to the rotating disk with the head carriage having a first side and a second side;

a first voice coil motor located in the first side of said head carriage and a second voice coil motor located in the second side of said head carriage for moving said head carriage relative to said frame, said first voice coil motor and said second voice coil motor each comprising:

a magnetic circuit structure mounted on said frame; and a drive coil mounted on said head carriage, wherein the drive coil of said first voice coil motor and the drive coil of said second voice coil motor are connected in parallel to an electric power source with the drive coil of the first voice coil motor having a number of turns that is less than the number of turns of the drive coil of the second voice coil motor and being smaller in size relative to the size of the drive coil of the second voice coil motor such that said first voice coil motor and said second voice coil motor generate substantially equal propulsive forces to cause the head carriage to move with precision.

2. The disk apparatus as claimed in claim 1, the drive coil of the first voice coil motor having a size that is smaller than the size of the drive coil of the second voice coil motor and, consequently, permitting inclusion of a separate member using a space formed between the frame and the drive coil of the first voice coil motor.

3. The disk apparatus as claimed in claim 2, the separate member included using the space formed between the frame and the drive coil of the first voice coil motor being a head carriage position read mechanism for reading a position of the head carriage.

* * * * *

UNITED STATES PATENT AND TRADEMARK OFFICE
CERTIFICATE OF CORRECTION

PATENT NO. : 6,392,847 B1  
DATED : May 21, 2002  
INVENTOR(S) : Hidetoshi Kabasawa and Nobuyuki Oida It is certified that error appears in the above-identified patent and that said Letters Patent is hereby corrected as shown below:

<u>Title page, Item [54] and Column 1, lines 1 and 2,</u>
Title, "DISK APPARATUS WITH SPECIAL COILS FOR VOICE COIL MOTOR" is incorrect and should instead read as follows: -- DISK APPARATUS --

Signed and Sealed this

Eighth Day of April, 2003

JAMES E. ROGAN
*Director of the United States Patent and Trademark Office*